Nov. 6, 1956    C. R. BROWN    2,769,283
ABRADING MACHINE FOR TIRE TREAD SURFACES
Filed April 13, 1954    3 Sheets-Sheet 1

INVENTOR.
CHARLES R. BROWN,
BY
McMorrow, Berman + Davidson
ATTORNEYS.

INVENTOR.
CHARLES R. BROWN,
BY
McMorrow, Berman & Davidson
ATTORNEYS.

United States Patent Office 2,769,283
Patented Nov. 6, 1956

2,769,283

ABRADING MACHINE FOR TIRE TREAD SURFACES

Charles R. Brown, Santa Cruz, Calif.

Application April 13, 1954, Serial No. 422,828

2 Claims. (Cl. 51—97)

This invention relates to power operated machines for reconditioning used pneumatic tire casings and more particularly to an abrading machine for reconditioning tire tread surfaces on casings of various sizes. It is an object of this invention to provide an abrading machine for tire tread surfaces which is readily adjustable to accommodate casings of various sizes so as to recondition the tire tread thereon to a circular circumferential shape and to a transverse curvature corresponding to the specified transverse curvature of the tire when new so that the casing will be in condition for a subsequent retreading operation.

It is another object of this invention to provide an abrading machine for tire tread surfaces which is adjustable so that the tire on which the tread surfaces to be abraded may be kept in contact with a cutting wheel in such manner that a flat or large radius of the casing can be reached, or by readjusting, a high crown or sharp radius can be reached on the tire casing by the abrading or cutting wheel.

Another and still further object of this invention is to provide an abrading machine which is of unitary construction and readily portable, so that it can be moved from one location to another with relative ease; and which is simple, strong and durable in construction, economical to manufacture and operate, and accurate, rapid and efficient in operation.

Yet another object of this invention is to provide an abrading machine in which the abrading wheel may be selectively moved toward the tire casing upon which the abrading or cutting wheel is to contact the tire tread surface thereof while the machine is in operation, and to provide selective adjustment whereby the tire may be moved toward the abrading or cutting wheel so that continued operation of the cutting wheel or abrading wheel may be effected while the machine is in operation. Also, the controls whereby the movement of the cutting or abrading wheel and tread surface of the tire casing may be moved toward and away from each other are conveniently located so that the operator may selectively move either the tire or the abrading wheel, or both may be moved relative to each other so as to have the machine selective at all times as to the amount of cutting to be accomplished and the accuracy and speed with which the machine will operate upon the tire casing will be greatly increased.

Other objects and advantages will become apparent from the following detailed description, forming the specification, taken in conjunction with the accompanying drawings, wherein:

Figure 7 is a cross sectional view taken on line 7—7 of Figure 2.

Figure 1:
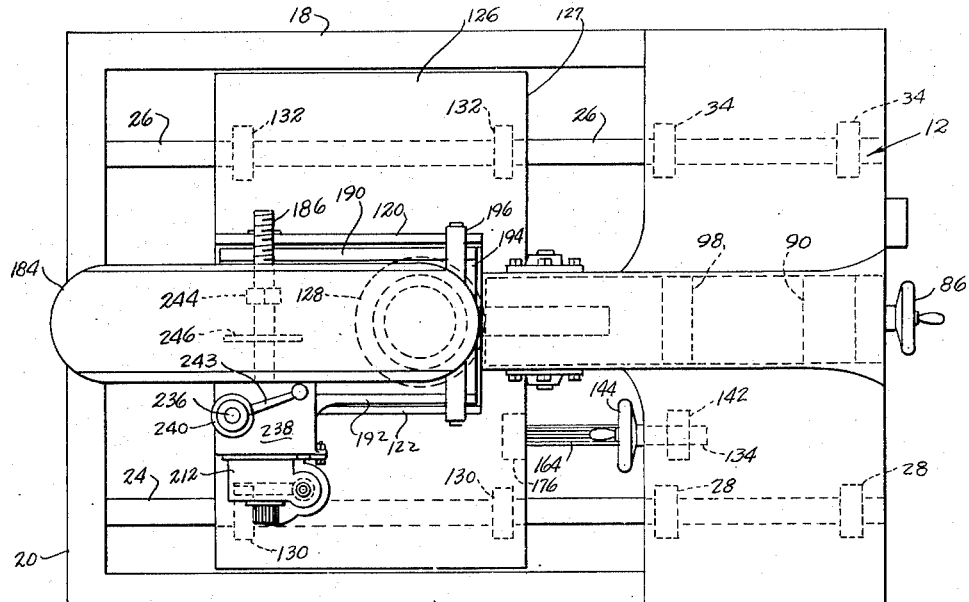
Figure 1 is a top plan view of an abrading machine embodying this invention.
Figure 2:
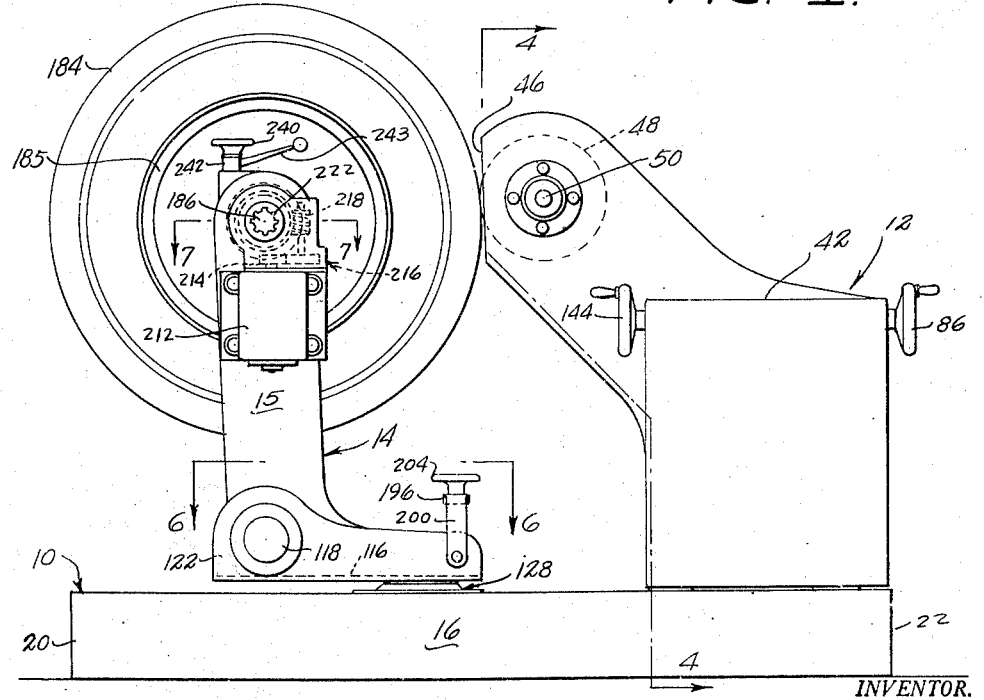
Figure 2 is a side elevational view.

With continued reference to the drawings, there is shown an abrading machine for tire tread surfaces which includes a base, generally indicated at 10 an upstanding support structure, generally indicated at 12, carried by the base, and a standard or tower, generally indicated at 14, also carried by the base 10 and in spaced relation to the support structure 12.

The base 10 is generally rectangular and comprises a pair of spaced parallel side walls 16 and 18 and a pair of spaced parallel end walls 20 and 22 which extend between the side walls 16 and 18 at opposite ends thereof. The side walls and end walls being connected together at their respective ends so as to have the base 10 comprise an open frame. The side walls 16 and 18 may be considered to be extending longitudinally of the base while the end walls 20 and 22 extend transversely thereof. The side walls and end walls are preferably of channel shaped cross section.

A pair of round slide rails 24 and 26 extend longitudinally of the base 10 in spaced parallel relation and secured at their respective opposite ends upon the end walls 20 and 22 intermediate the top and bottom edges of the respective side walls. The slide rail 24 is disposed adjacent the side wall 16 of the base while the slide rail 26 is disposed closely adjacent the side wall 18, the slide rails 24 and 26 being parallel with the side walls 16 and 18.

Figure 4:
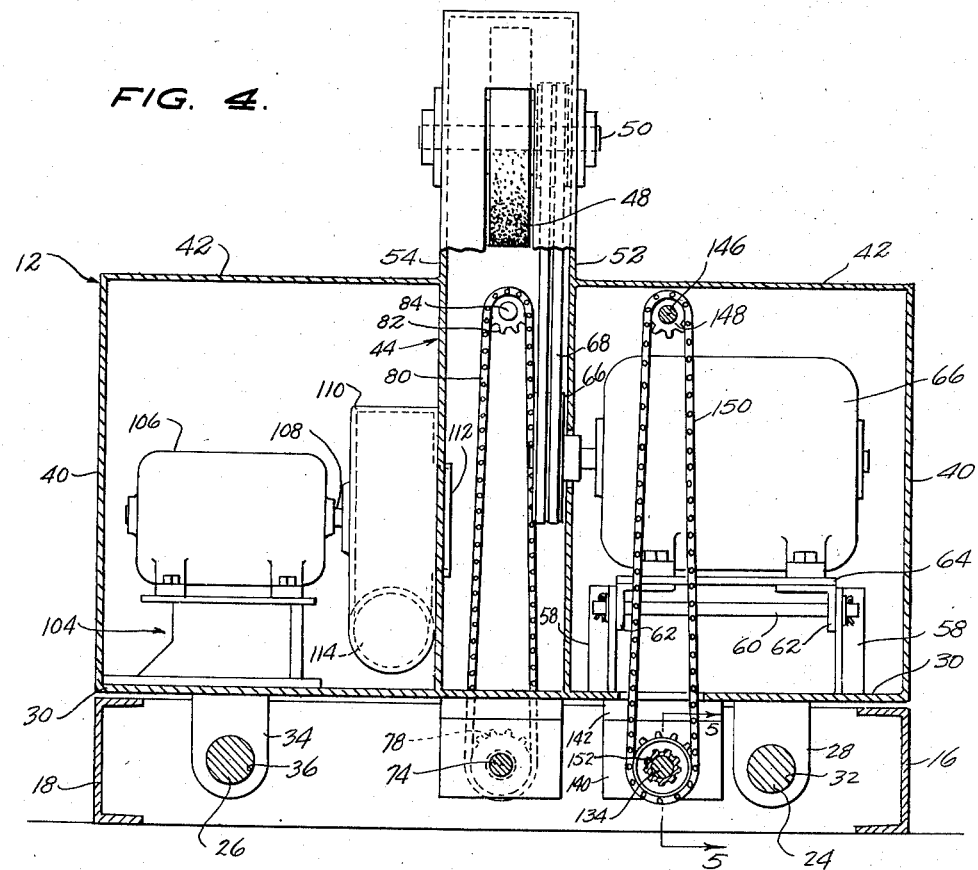
Figure 4 is a cross sectional view taken on line 4—4 of Figure 2.

A pair of slide rail bearings 28 are secured to the lower surface of the bottom wall or base 30 of the support structure 12 in longitudinally spaced parallel relation and are provided with openings 32 which are in axial alignment so as to receive the slide rail 24 therein and be slidable along the rail 24. A similar pair of longitudinally spaced slide rail bearings 34, one of which is clearly seen in Figure 4, is similarly depending from the lower surface of the bottom wall 30 of the support structure 12 and in spaced parallel relation with each other and with the corresponding ones of the pair of bearings 28. Each of the slide rail bearings 34 is provided with an aperture 36 which are in axial alignment so as to receive the slide rail 26 therethrough and to be slidable on the rail 26. Thus, the slide rail bearings 28 and 34 define a carriage for mounting the support structure 12 thereon. The carriage thus defined is mounted in the base 10 for movement in a rectilinear path longitudinally of the base since the carriage is slidably mounted on the slide rails 24 and 26 which extend longitudinally of the base 10.

The support structure 12 is normally disposed adjacent one end of the base 10 having the end wall 22. The structure 12 has a pair of spaced, parallel end walls 38 extending upwardly from opposite sides of the base 30 and a pair of spaced parallel side walls 40 extending upwardly from the opposite ends of the base 30 which are disposed at right angles to the sides from which the end walls extend, the side walls and end walls being connected together at their respective adjoining ends so as to provide an enclosed, generally rectangular housing, since the top wall 42, which is in spaced parallel relation to the bottom wall or base 30 is secured along its peripheral edges to the top edges of the respective pairs of end walls 38 and side walls 40. Disposed centrally between the side walls 40 and extending upwardly from the bottom wall 30 of the support structure 12, is a generally rectangular housing, generally indicated at 44, which extends above the top wall 42 and outwardly therefrom in a direction away from the end wall 22 of the base 10 and toward the opposite end of the base. The housing 44 is provided with an open end 46 at the end thereof remote from the base or bottom wall 30 so that an abrading wheel 48 may extend therethrough The abrading wheel 48 is positioned transversely of the housing 44 and is journaled in opposite side walls 52 and 54 thereof.

Figure 3:
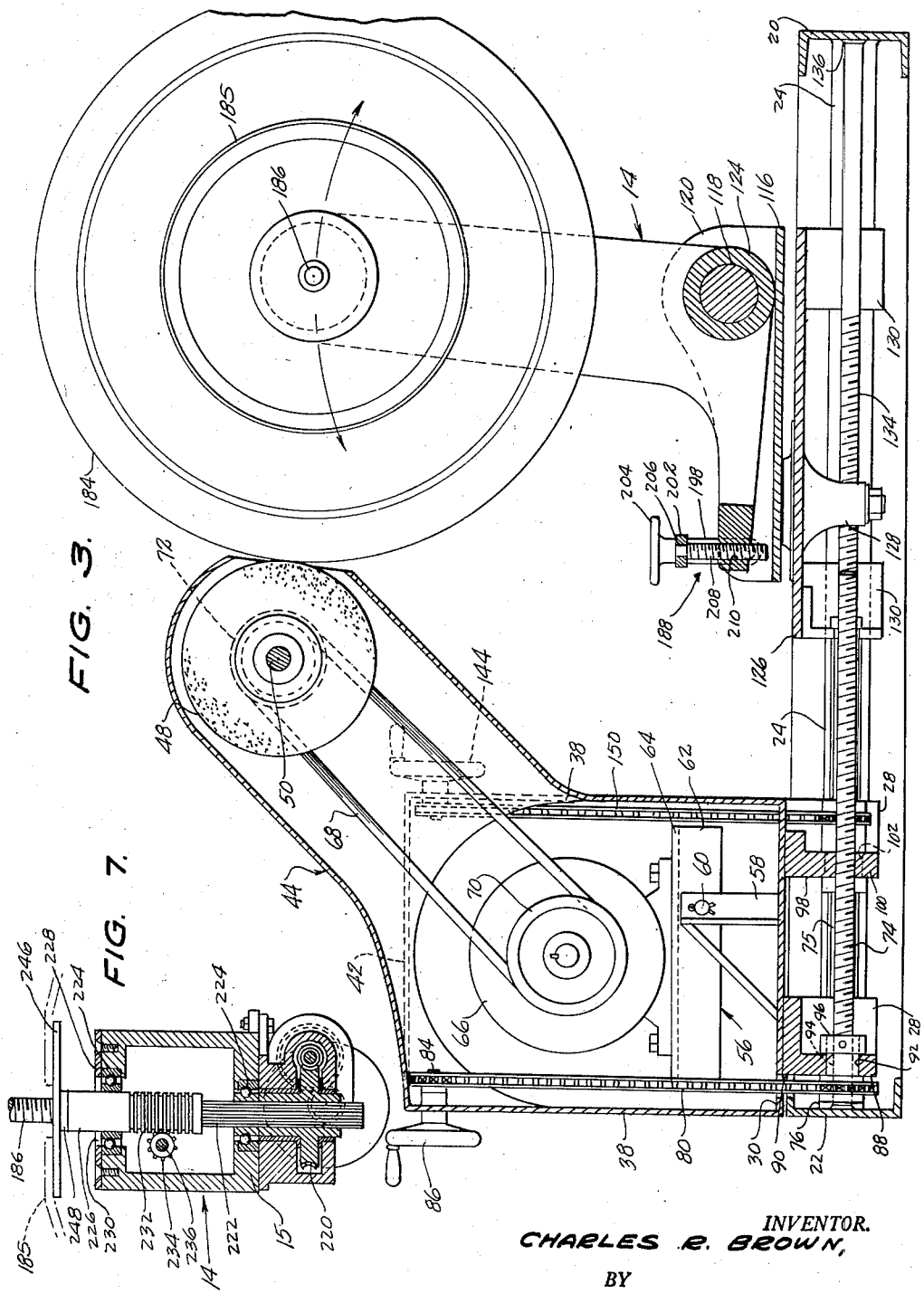
Figure 3 is a vertical cross sectional view of the abrading machine on a somewhat enlarged scale.

Carried upon the base or bottom wall 30 is a motor mount generally indicated at 56 comprising a pair of spaced parallel standards 58 having a pivot bar 60 extending therebetween and adjacent the top end thereof. The pivot bar 60 extends through a pair of oppositely disposed motor support plate brackets 62 formed of angle iron and extending longitudinally of the support structure 12 between the end walls 38 thereof and supports thereon a motor mounting plate 64 upon which is secured a motor 66. As clearly shown in Figure 3, the pivot bar 60 extends transversely between the brackets 62 and is disposed toward one end thereof so that it is off center with relation to the horizontal axis of the motor 66 so that the motor mounting plate will be movable in an arcuate path about the center line of the pivot bar 60 as an axis to cause the drive belt 68 trained about a pulley 70 secured on the drive shaft of the motor to remain taut in its driving relation between the pulley 70 and the pulley 72 mounted on the arbor 50 in order to impart rotation to the abrading wheel 48 also rotatably carried upon the arbor 50.

The motor 66 is the cutting or abrading wheel drive motor and is mounted so as to be disposed totally within the support structure 12 and at one side thereof adjacent the side wall 40 which is adjacent the side wall 16 of the base 10, as will be clearly appreciated from the showing in Figure 4.

An adjusting screw 74 extends centrally longitudinally of the base 10 parallel to and between the rails 24 and 26. The screw 74 has one end thereof rotatably journaled in a bearing 76 secured to the inner surface of the end wall 22 intermediate its ends and its other end similarly journaled on the inner surface of end wall 20. A sprocket wheel 78 is secured upon the adjusting screw 74 adjacent the bearing 76 to have trained thereabout a sprocket chain 80 which is trained about a sprocket wheel 82 mounted for rotation on a shaft or arbor 84 journaled in one of the end walls 38 adjacent the end wall 22 of the base 10 and near the top wall 42 of the support structure 12. The shaft or arbor 84 carries at its ends remote from the end upon which the sprocket wheel 82 is carried, a hand wheel 86 which is disposed externally and spaced from the adjacent end wall 38. Thus, rotation of the hand wheel 86 will be imparted to the adjusting screw 74 through the sprocket chain 80 and the sprocket wheels 78 and 82 over which it is trained at opposite ends. One leg 88 of a right angle adjusting screw support 90 which is dependingly carried by the lower surface or face of the base or bottom wall 30 adjacent the end wall 22 of the base 10 is provided with an opening 92 therethrough through which the adjusting screw 74 may extend. The screw 74 may be supported in the leg 88 within a sleeve 94 which is snugly received within the opening 92 and is further provided with a collar 96 thereon which is adapted to be secured by a set screw so as to be in abutting relation with the leg 88 of the adjusting screw support 90 on the face thereof remote from the sprocket wheel 78 to thereby limit the longitudinal movement of the base or bottom wall 30 in one direction. A right angularly formed bracket 98 is secured upon the lower surface of the bottom wall or base 30 and has one leg 100 depending therefrom and perpendicular thereto. The leg 100 is provided with a tapped opening 102 therethrough which is in alignment with the opening 92 and threadingly receives the threaded portion 75 of the adjusting screw 74 therein. Thus, it will be seen that by rotation of the hand wheel 86, rotation will be imparted to the adjusting screw 74 so that the support structure 12 will be moved longitudinally of the base 10 toward and away from the standard 14 upon the carriage defined by the bearings 28 and 34 in a rectilinear path.

Mounted within the housing of the support structure 12 upon the bottom wall or base 30 and adjacent the side wall 40 remote from the side wall adjacent to which the abrading wheel drive motor 66 is mounted, is carried a motor mount, generally indicated 104, and upon which is mounted for horizontal operation a blower motor 106. The drive shaft 108 of the motor 106 is operatively connected to a blower encased within a blower housing 110 disposed adjacent the side wall 54 of the housing 44 and carried thereby and housing housing 110 has an opening 112 extending within the interior of the housing 44 and another opening 114 disposed at one end thereof remote from the top and disposed perpendicularly to the opening 112 but in communication therewith so that material cut by the abrading wheel 48 and thrown into the housing 44 may be withdrawn therefrom by the action of the blower within the housing 110 by drawing this waste material through the opening 112 and out through the opening 114 which may be directed to a suitable bin or other place where the waste is to be deposited externally of the machine.

The standard 14 is carried by a platform 116 for movement in a vertical arcuate path about a horizontal axis provided by a pin 118 extending therethrough adjacent the lower end thereof, with the opposite ends of the pin 118 rotatably journaled in flanges 120 and 122 which extend longitudinally along opposite sides of the platform 116 and are upstanding therefrom in perpendicular relation. A bearing bushing 124 is provided in between the respective flanges 120 and 122 wherein the pin 118 may be suitably journaled for rotation. Naturally, the bearing bushing 124 may be in the form of a sleeve carried in a suitable opening in the standard 14 and extending transversely therethrough, as shown. The platform 116 is carried upon a support plate 126 of generally rectangular outline extending transversely across the frame 10 and adjacent the end thereof remote from the end wall 22 and more closely adjacent the end wall 20, and the platform 116 is carried by the plate 126 for movement in a horizontal arcuate path above and parallel to the base 10 and the support plate 126 upon a bearing, generally indicated at 128, carried by the support plate 126.

The support plate 126 is provided with a pair of slide rail bearings 130 which are in longitudinally spaced parallel relation and provided with openings therein which are in axial alignment so as to receive therein the slide rod 24 so that the bearings 130 are slidable thereon. A similar pair of longitudinally spaced slide rail bearings 132 are dependingly carried by the lower surface of the support plate 126 in spaced parallel relation and to the sides thereof adjacent the side wall 18 of the base 10 to slidably receive therein the slide rail 26. Thus, the bearings 130 and 132 define a carriage upon which support plate 126 is mounted and the column or standard 14 carried upon the platform 116 which is rotatably mounted upon the support plate 126, so that the entire structure can be moved longitudinally of the base in a rectilinear path toward and away from the support structure 12.

In order to selectively move the column or standard 14 toward and away from the support structure 12 upon the carriage defined by the bearings 130 and 132, there is provided an adjusting screw 134 which extends longitudinally of the base 10 and has one end thereof rotatably journaled in a bearing 136 secured to the end wall 20 intermediate its upper and lower ends and supporting received adjacent its other end in a sleeve-like boss 154 formed on a sprocket wheel 152 and extending through an opening 138 provided through one leg 140 of a right angular bracket or bearing support 142, the other leg of which is secured to the lower surface of the bottom wall or base 30 of the support structure 12 adjacent the end wall 38 remote from the end wall 22 of the base 10 and offset with respect to the longitudinal center line through the structure 12 to the side thereof adjacent the side wall 16 of the base 10. A hand wheel 144 is secured upon a shaft 146 journaled in the end wall 38 remote from the end wall in which the hand wheel shaft 84 is journaled so that the hand wheel 144 is disposed externally of the housing of the support structure 12 with the shaft 146 extending therewithin and having secured thereon adjacent its end remote from the hand wheel 144, a sprocket wheel 148 about which the sprocket chain 150 is trained and engages with the teeth on the sprocket wheel 148. The chain 150 is also connected to a sprocket wheel 152 carried on the adjusting screw 134. Thus, upon rotation of the hand wheel 144, rotation will be imparted to the sprocket wheel 148 and through the chain 150 to the sprocket wheel 152 upon the adjusting screw 134.

A sleeve-like boss 154 is formed integrally with the sprocket wheel 152 and extends longitudinally of the adjusting screw 134 and has a reduced portion 156 thereof received in the opening 138 in the bearing support bracket 142. Thus, there is formed a stop shoulder 158 formed annularly upon the sleeve-like boss 154 which will be in abutting relation with one face of the leg 140 of the bearing support bracket 142. The end of the boss 154 extending beyond the opening 138 on the side thereof remote from the teeth 151 on the sprocket 152 carries thereabout a collar 160 which is secured to the sleeve-like boss 144 by a set screw 162, so that the sprocket wheel 152 will be prevented from having longitudinal end play with respect to the bearing support bracket 142.

The adjusting screw 134 is surrounded by a splined sleeve 164 which extends longitudinally thereof for substantially the entire length of the adjusting screw and is received in a splined opening 166 longitudinally through the wheel 152 and the sleeve or boss 154, so that the adjusting screw 134 may freely slide through the wheel and sleeve or boss when the support structure 12 is selectively moved in its rectilinear path.

Figure 5:
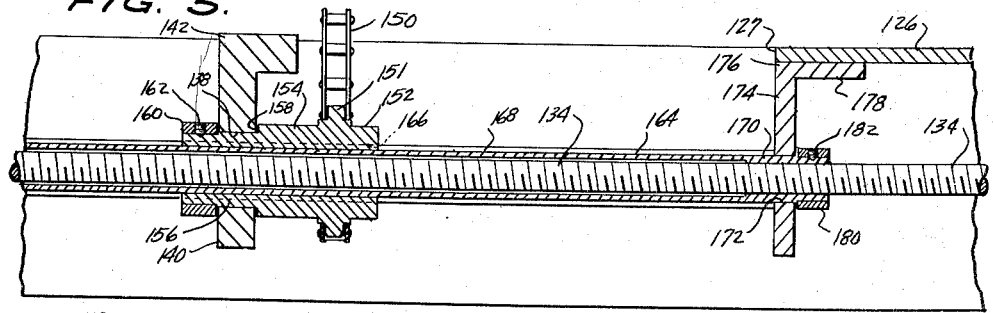
Figure 5 is a sectional view taken on line 5—5 of Figure 4 and shown on a somewhat enlarged scale.
Figure 6:
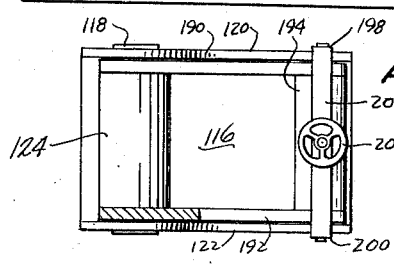
Figure 6 is a view taken on line 6—6 of Figure 2.

The splined sleeve 164 is provided with an annular chamber 168 between the threaded shank of the adjusting screw 134 and the inner surface of the splined sleeve 164 for substantially the entire length thereof, however, at one end, the splined sleeve is provided with an internally portion 170 which is in threaded engagement with the external threads of the adjusting screw 134. As clearly shown in Figure 5, the threaded portion 170 of the splined sleeve 164 is received in an aperture 172 provided through one leg 174 of a bearing support bracket 176 which has its other leg 178 extending from the leg 174 and perpendicularly thereto in a direction away from the sprocket wheel 152 and has its upper surface secured to the lower surface of the support plate 126 adjacent its transverse edge 127. The opening 172 is, of course, in axial alignment with the splined opening 166 in the sprocket wheel 152 so that the bearing support bracket 176 is in spaced parallel relation with the bearing support bracket 142. The terminal end of the threaded portion 170 of the splined sleeve 164 which extends beyond the leg 174 of the bearing support bracket 176 to the side thereof remote from the sprocket wheel 152 has a collar 180 secured thereon by a screw 182 so as to bear against the vertical surface of the leg 174 of the bracket 176 remote from the sprocket wheel 152.

Thus, it will be seen that upon rotation of the hand wheel 144, the sprocket chain 150 will impart rotation to the sprocket wheel 152, which, in turn due to its splined connection with the sleeve 164 will impart rotation thereto and because of the threaded connection of the portion 170 of the splined sleeve 164 with the adjusting screw 134, the bracket 176 will be caused to move in response to the rotation of the sleeve 164 and thereby cause the support plate 126 and the standard 14 carried thereon to move in a rectilinear path longitudinally of the base 10 toward and away from the structure 12. This rectilinear movement of the standard 14 is selective by action of the operator of the machine.

As previously pointed out, the standard 14 is movable in a vertical arcuate path about a horizontal axis and may be selectively fixed in a desired position in its arcuate path of movement. In order to selectively secure the standard in the desired position in its arcuate path of movement so that a tire 184 rotatably mounted upon a shaft 186 journaled adjacent the top of the standard 14 can be maintained in the desired degree of contact with the abrading wheel 48, there is provided an adjusting means generally indicated at 188. The adjusting means 188 comprises a frame of generally U-shape having its opposite spaced parallel legs 190 and 192 secured at one end to the opposite ends of the bearing bushing 124 in the lower end of the standard 14 and extending therefrom in a direction toward the bearing 128 and disposed closely adjacent the flanges 120 and 122 respectively and extending parallel thereto with each of the legs 190 and 192 within the space between the flanges 120 and 122. A cross piece or bight 194 extends across the ends of the legs 190 and 192 remote from the ends secured upon the bearing bushing 124, thus completing the frame. A generally U-shaped bracket 196 has its opposite legs, which are in spaced parallel relation and indicated as 198 and 200, secured at their free ends to the outer surface of the respective flanges 120 and 122 adjacent the end of the respective flanges remote from the pivot pin 118 and extend upwardly therefrom perpendicular to the platform 116, and has a bight 202 connecting the opposite ends of the legs remote from the free ends thereof connected to the respective flanges 120 and 122, so that the bight 202 extends transversely across the platform 116 in parallel relation thereto and above the top of the flanges 120 and 122 carried upon the platform. A small hand wheel 204 has its shaft 206 extending through an opening provided centrally through the bight 202 intermediate its ends and carries an adjusting screw 208 thereon which extends vertically with respect to the platform 116 and perpendicularly to the horizontal center line of the bight 202 and in a direction below the bight 202 toward the platform 116. A tapped opening 210 is provided in the cross piece 194 to threadingly receive the adjusting screw 208 therein.

Thus, by turning the hand wheel 204, it will be possible to fix the desired position of the standard 14 in a selected point along its path of arcuate movement about its horizontal axis provided by the horizontal center line of the pivot pin 118. Hence, by moving the carriage defined by the bearings 130 and 132 and moving the adjusting means to move the standard 14 and the tire 184 rotatably carried thereon in its arcuate path of movemenet to a selected fixed postiion, to maintain the tire 184 in contact with the cutting or abrading wheel 48, a flat or large radius on the tread surface of the tire 184 can be reached, and by setting the adjusting means 188 so as to move the standard 14 and the tire 184 carried thereon in the opposite direction in its arcuate path, a high crown or sharp radius can be reached by the cutting or abrading wheel 48.

Mounted on the standard 14 on one side 15 thereof, adjacent to the side wall 16 of the base 10 is a gear reduction motor 212 adjacent the top of the standard, with the drive shaft of the motor 212 disposed in a vertical plane and extending outwardly from the end of the motor 212 adjacent the top of the standard 14. The drive shaft 214 of the motor 212 is operatively connected to the arbor 186 to drive the same through a gear reduction system, generally indicated at 216. The gear reduction 216 includes a worm 218 which drives a worm wheel 220 which has a splined bore longitudinally therethrough to mate with corresponding splines 222 on the arbor 186 so that the arbor can move longitudinally of its longitudinal center line through the worm gear 220. The arbor 186 is journaled in opposite sides of the standard 14 in anti-friction bearings 224 so that the arbor 186 extends transversely through the standard 14 and beyond the opposite sides thereof in which it is journaled. A sleeve 226 is carried on the arbor 186 for rotation therewith and extends from the splined section 222 through the anti-friction bearing 224 in the side of the standard 14 remote from the side 15 and beyond the standard 14 outwardly thereof. In this connection, it should be noted that the anti-friction bearing 224 carried in the side wall of the standard 14 remote from the side wall or side 15 is maintained therein by a plate 228 secured to the side wall of the standard 14 by a plurality of screws or bolts and provided with the central opening 230 through which the sleeve 226 may extend so as to project outwardly of the adjacent side or side wall of the standard 14.

The sleeve 226 is provided with a cylindrical rack 232 milled therein and adapted to mesh with the pinion gear 234 which is secured upon a vertical shaft 236 which extends through the top 238 of the standard 14 and carries at its distal end remote from the pinion gear 234 a hand wheel 240, of relatively small diameter, on that portion of the vertical shaft 236 which extends upwardly beyond the top 238 of the standard 14 and is spaced from the top thereof by a spacer and tightening collar 242 threadingly carried on the shaft 236 and which has one end of a laterally extending handle 243 secured thereon, the other end of the handle being provided with a knob. Thus, the arbor 186 may be selectively shifted along its longitudinal axis so that the tire 184 carried upon a wheel or rim 185 which is carried by the arbor shaft 186 and secured thereon by a nut 244 threadingly received on the threaded end portion of the shaft or spindle 186 remote from the portion thereof having the splines 222 and the handle 243 moved so that the collar 242 locks the arbor 186 in the selected adjusted position. The wheel or rim 185 is held securely on the shaft or arbor 186 by the nut 244 and having the other side of the rim or wheel 185 abutting against a circular vertically disposed flange 246 carried on the shaft or arbor 186 by a collar 248 preferably formed integrally with the flange and secured on the arbor, and the tire wheel and tire assembly can thus be shifted longitudinally in a horizontal rectilinear path upon operation of the hand wheel 240 so that it will be easy to adjust the tread surface of the tire 184 to the cutting or abrading wheel center for accurate abrading operation of the tread surface on the tire 184. The arbor is in its selected adjusted position by movement of tightening collar 242 by the handle 243.

From the foregoing, it will be apparent that there has been provided an abrading machine for the tire tread surfaces of a tire 184 which comprises the base 10, a first carriage, defined by the bearings 28 and 34, mounted in said base for movement in a rectilinear path longitudinally of the base, an upstanding support structure 12 carried by the carriage for movement therewith, an abrading wheel 48 rotatably carried by the structure; a second carriage, defined by the bearings 130 and 132, arranged in spaced parallel relation with respect to the first carriage, defined by the pair of bearings 28 and 34, and connected to the base 10 for movement in a rectilinear path longitudinally of the base, a support plate 126 carried by the second carriage for movement in a horizontal path therewith above and parallel to the base, a platform 116 carried by the support plate 126 for movement in a horizontal arcuate path above and parallel to the support plate 126 and the base 10, a standard 14 carried by the platform 116 for movement in a vertical arcuate path about the horizontal axis defined by the center line of the pivot pin 118 and adapted to rotatably mount the tire 184 therein; means carried by the support structure 12 and operatively connected to the first carriage to selectively move the carriage in its rectilinear path toward and away from the standard 14 thereby moving the support structure 12 and the abrading wheel toward and away from the standard 14 and the tire 184 rotatably mounted thereon; and other means also carried by the structure 12 and operatively connected to the second carriage to selectively move the carriage in its rectilinear path toward and away from the structure 12 so that the tire 184 carried upon the standard 14 which will move longitudinally of the base 10 upon selective operation of the other means carried by the structure 12 to have the tire 184 in contact with the abrading wheel 48 so that the tire tread surface of the tire 184 may be cut or abraded to have the desired shape and be prepared for future retreading operations.

Among the features of the present invention, it will be seen that the tire 184 will be positively driven by the motor 212 through the gear reduction 216 since it is secured upon the shaft or arbor 186 which is operatively connected to the motor 212 through the gear reduction 216. Therefore, the tire 184 will not rotate freely upon the arbor or shaft 186 but will be positively driven when secured thereon so that as its tread surface is placed in contact with the abrading wheel 48, and a more thorough and accurate abrading action of the tire tread surface will result. As the tire 184 is moved toward the abrading wheel 48 by turning the hand wheel 144, or the abrading wheel 48 is moved toward the tire 184 by rotation of the hand wheel 86, so that the tread surface of the tire 184 is in contact with the abrading wheel 48, there are several adjustments that can be accomplished both prior to and during the subsequent abrading operation.

These adjustments include placing the standard 14 in a fixed selected position in its arcuate path of movement about the horizontal axis defined by the center line of the pivot pin 118 by manipulation of the adjusting means 188 in the manner hereinbefore described. This will permit the operator to so have the tread surface of the tire contact the cutting or abrading wheel 48 so that a flat or large radius can be reached, or a high crown or sharp radius of cutting can be accomplished. Also, by the manipulation of the hand wheel 240, the tire 184 may be shifted transversely of the standard 14 thus permitting adjustment of the tire transversely of the cutting or abrading wheel center insuring more accurate and efficient operation of the machine. During the operation of the machine, the operator may selectively move either the tire toward the abrading wheel 48 by turning the hand wheel 144 or may move the abrading wheel 48 into further operating contact with the tire tread surface of the tire 184 by turning the hand wheel 86. It will be noticed that both the hand wheels 144 and 86 are carried by the support structure 12 adjacent the top thereof to be within easy reach of an operator so that he can easily and efficiently control the abrading operation of the machine with respect to moving the abrading wheel or the tire to be abraded into and out of contact with each other.

In common with the operation of similar abrading machines, the standard 14 will oscillate about its vertical axis defined by the bearing 128 during the abrading operation so that the entire surface of the treads will be covered by the abrading action of the wheel 48 since the standard is mounted on the support plate 126 for movement in a horizontal arcuate path above and parallel to the base 10.

While there is shown and described the preferred embodiment of the invention, it is to be understood that the structure is susceptible to change and modification within the practicability of the invention and therefore should be limited only by the scope of the claims appended hereto.

What is claimed is:

1. An abrading machine for tire tread surfaces comprising a horizontally disposed elongated base, having parallel upstanding side walls and parallel upstanding end walls extending between said side walls at opposite ends thereof, a pair of guide rails arranged in parallel relation longitudinally of said base between said side walls and secured at opposite ends to said end walls, transversely spaced pairs of longitudinally spaced bearings defining a carriage with one pair of said bearings slidable on one of said rails and the other pair of said bearing slidable upon the other of said rails, an upstanding support structure carried on said carriage for movement therewith longitudinally of said base from adjacent one end of said base toward and away from the other thereof, an abrading wheel rotatably mounted on said structure, other transversely spaced pairs of longitudinally spaced bearings defining another carriage with one pair of said other pairs of bearings slidably mounted on said one rail and the other pair of said another pair of bearings slidable on the other of said rails longitudinally thereof, a support plate carried by said another carriage in spaced relation to said structure for movement in a rectilinear path longitudinally of the base, a platform carried by said plate for movement in an arcuate horizontal path above and parallel to said plate, a standard carried by said platform for movement in a vertical arcuate path about a horizontal axis, means on said standard adapted to rotatably mount a tire thereon, a first adjusting screw journaled at its opposite ends in said end walls to extend longitudinally in said base and operatively connected to said structure and upon rotation of said screw causing movement of said structure longitudinally of said base on said rails toward and away from said standard, means carried by said structure and operatively connected to said adjusting screw for selectively imparting rotation thereto whereby said structure can be selectively moved toward and away from said standard, a second adjusting screw journaled in said base to extend longitudinally thereof and operatively connected to said support plate and upon rotation of said second adjusting screw causing movement of said structure longitudinally of said rails, means on said structure operatively connected to said second adjusting screw for selectively imparting rotation thereto whereby said standard can be selectively moved toward and away from said structure.

2. An abrading machine for tire tread surfaces comprising a horizontally disposed elongated base, a first carriage mounted in said base adjacent one end thereof for movement in a rectilinear path longitudinally of said base, an upstanding support structure carried by said carriage for movement therewith, an abrading wheel rotatably carried by said structure, a second carriage arranged in spaced relation with respect to said first carriage and connected to said base for movement in a rectilinear path longitudinally of said base, a support plate carried by said second carriage for movement therewith, a platform having upstanding flanges along opposite side edges thereof carried by said plate for movement in a horizontal arcuate path above and parallel to said plate, a pin rotatably journaled adjacent opposite ends in said flanges, a standard rotatably mounted on said pin for movement in a vertical arcuate path about a horizontal axis defined by said pin, means carried on said standard adapted for rotatably mounting a tire thereon, means carried by said structure and operatively connected to said first carriage to selectively move the carriage in its rectilinear path toward and away from said standard thereby moving said support structure and abrading wheel toward and away from said standard and the tire rotatably mounted thereon, and other means carried by said structure and operatively connected to said second carriage to selectively move the carriage in its rectilinear path toward and away from said structure thereby moving said standard and the tire rotatably mounted thereon toward and away from said support structure and the abrading wheel rotatably mounted on said structure.

References Cited in the file of this patent

UNITED STATES PATENTS

| | | |
|---|---|---|
| 465,695 | Friedel | Dec. 22, 1891 |
| 2,271,130 | Pearson | Jan. 27, 1942 |
| 2,294,047 | Pollock | Aug. 25, 1942 |
| 2,321,936 | Pollock | June 15, 1943 |
| 2,392,667 | Hawkinson | Jan. 8, 1946 |
| 2,515,167 | Arel | July 18, 1950 |
| 2,522,819 | Glynn | Sept. 19, 1950 |
| 2,610,446 | Hawkinson | Sept. 16, 1952 |